(12) United States Patent
Saito

(10) Patent No.: US 6,480,884 B1
(45) Date of Patent: Nov. 12, 2002

(54) E-MAIL APPARATUS, INTERNET FACSIMILE APPARATUS, AND E-MAIL COMMUNICATION SYSTEM

(75) Inventor: Kyoji Saito, Kawasaki (JP)

(73) Assignee: Matsushita Graphic Communication Systems, Inc., Tokyo (JP)

(*) Notice: Subject to any disclaimer, the term of this patent is extended or adjusted under 35 U.S.C. 154(b) by 0 days.

(21) Appl. No.: 09/327,488

(22) Filed: Jun. 8, 1999

(30) Foreign Application Priority Data

Feb. 4, 1999 (JP) ............................................ 11-027096

(51) Int. Cl.⁷ .............................................. G06F 15/16
(52) U.S. Cl. ....................... 709/207; 709/206; 358/400; 358/402; 345/752
(58) Field of Search ................................ 709/246, 206, 709/207, 233, 231; 712/220; 358/402, 400; 345/752; 379/93.24

(56) References Cited

U.S. PATENT DOCUMENTS

| | | | | |
|---|---|---|---|---|
| 5,734,901 A | * | 3/1998 | Sidhu et al. | |
| 5,881,233 A | * | 3/1999 | Toyoda et al. | |
| 6,097,797 A | * | 8/2000 | Oseto | ........................ 358/402 |
| 6,108,691 A | * | 8/2000 | Lee et al. | |
| 6,141,695 A | * | 10/2000 | Sekiguchi et al. | |
| 6,211,972 B1 | * | 4/2001 | Okutomi et al. | |
| 6,327,612 B1 | * | 12/2001 | Watanabe | |
| 6,374,291 B1 | * | 4/2002 | Ishibashi et al. | ............ 358/400 |

FOREIGN PATENT DOCUMENTS

| | | |
|---|---|---|
| JP | 2-78340 | 3/1990 |
| JP | 6309133 | 11/1994 |
| JP | 8292864 | 11/1996 |
| JP | 9251371 | 9/1997 |
| JP | 10254665 | 9/1998 |
| JP | 11-17852 | 1/1999 |

OTHER PUBLICATIONS

An English Language abstract of JP 11–17852.
An English Language abstract of JP 2–78340.
An English Language abstract of JP 6–309133.
An English Language abstract of JP 8–292864.
An English Language abstract of JP 9–251371
An English Language abstract of JP 10–254665.

* cited by examiner

Primary Examiner—Ayaz Sheikh
Assistant Examiner—Oanh Duong
(74) Attorney, Agent, or Firm—Greenblum & Bernstein, P.L.C.

(57) ABSTRACT

If there is an address input, a setting determining section checks whether or not a Bcc flag is on. Next, the setting determining section determines that a first address is set to a field [To:]. While, the setting determining section determines that addresses including and after a second address are set to a field [Bcc:]. Next, a header generating section describes the first input address in the field [To:] of a mail header. The addresses including and after the second address are described in the field [Bcc:] of the mail header. Next, the mail header generated by the header generating section and a TIFF file text-coded by a text coding section are combined with each other by a combining section, so that an e-mail is generated. As a result, the large number of addresses is automatically allocated to the fields [To:] and [Bcc:].

10 Claims, 10 Drawing Sheets

TRANSMIT MAIL

```
Date: Fri, 20 Nov 1998 21:52:45 +0900
Subject: TEST
From: user0@kk.lll.mmm
To: user1@aaa.bbb.Ccc        FIRST ADDRESS           MAIL HEADER
Bcc: user2@ddd.eee.fff  ←
Bcc: user3@xxx.yyy.zzz      ADDRESSES INCLUDING
                             AND AFTER SECOND
```

DATA SECTION
(TIFF FILE)

FIG. 6

RECEIVE MAIL

```
Date: Fri, 20 Nov 1998 21:52:45 +0900
Subject: TEST
From: user0@kk.lll.mmm                               MAIL HEADER
To: user1@aaa.bbb.Ccc
```

This is a test mail.

FIG. 7

E-MAIL APPARATUS, INTERNET FACSIMILE APPARATUS, AND E-MAIL COMMUNICATION SYSTEM

BACKGROUND OF THE INVENTION

1. Field of the Invention

The present invention relates to an e-mail apparatus for simultaneously transmitting one e-mail to a plurality of recipients, an internet facsimile apparatus for simultaneously transmitting one e-mail to a plurality of recipients, and an e-mail communication system for simultaneously transmitting one e-mail to a plurality of recipients.

2. Description of the Related Art

In recent years, e-mail has come into widespread use in a personal computer (PC). In PC, a destination setting of the e-mail is carried out using a mailer. More specifically, an address of a main destination of the mail is described in a field [To:] showing a destination of a mail header. Also, an address of simultaneous transmission destination is described in a field [Cc:] showing a simultaneous transmission destination. The input to these fields is manually performed by an operator arbitrarily.

For transmitting one e-mail to a plurality of addresses, a plurality of addresses is described in the field [To:] or field [Cc:]. In this case, since these fields are included in the mail header of the received e-mail, the recipient can know to whom the same mail is simultaneously transmitted.

In order to keep the simultaneous transmission secret, the simultaneous transmission destination can be described in the field including a field [Bcc] of the mail header. This address is called secret simultaneous transmission destination. A mail server replicates the mail and distributes it to the address described in field [Bcc:]. However, the field [Bcc:] is deleted by the mail server. As a result, the recipient can know the address of the destination and the simultaneous transmission destination, but cannot know the secret simultaneous transmission destination.

However, in the mailer that operates on the general PC, an operator must set the address to any one of the field [To:], filed [Cc:], or field [Bcc:]. For this reason, if there is a large number of transmission destinations, it is necessary to set the destination, simultaneous transmission destination, or secret simultaneous transmission destination (hereinafter referred to as transfer-attribute) for each address. In this reason, much time and effort are necessary to transmit one e-mail to a plurality of addresses.

There is an internet facsimile apparatus for receiving and transmitting image data by an e-mail over a computer network such as internet. Unlike the general PC, such an e-mail apparatus of a non-PC is operated by a control panel having only a 10-button keypad and function keys without providing a keyboard and a mouse. The task for setting the transfer-attribute to the address becomes more complicated and brings about unfavorable operability. As a result, there is a case in which the operator causes an error in setting the transfer-attribute to the address.

SUMMARY OF THE INVENTION

A first object of the present invention is to provide an e-mail apparatus, which can simply set a transfer-attribute to a plurality of addresses so as to easily carry out an e-mail simultaneous transmission.

A second object of the present invention is to provide an internet facsimile apparatus, which can simply set a transfer-attribute to a plurality of addresses so as to easily carry out an e-mail simultaneous transmission.

A third object of the present invention is to provide an e-mail communication method, which can simply set a transfer-attribute to a plurality of addresses so as to easily carry out an e-mail simultaneous transmission.

The above objects are achieved by an e-mail apparatus for simultaneously transmitting an e-mail to a plurality of destinations, having: inputting means for inputting an address of the e-mail; and destination setting means, when a plurality of addresses is input through the inputting means, for setting a first address of the plurality of addresses to a destination and addresses including and after a second address to a secret simultaneous transmission destination, respectively.

The above objects are achieved by an e-mail apparatus for simultaneously transmitting an e-mail to a plurality of destinations, having: inputting means for inputting an address of the e-mail; and destination setting means, when a plurality of addresses is input through the inputting means, for setting a default address and the plurality of addresses to a destination and a secret simultaneous transmission destination, respectively.

The above objects are achieved by an e-mail apparatus for simultaneously transmitting an e-mail to a plurality of destinations, having: inputting means for inputting an address of the e-mail; transfer-attribute designate means for designating transfer-attribute of any one of a destination, a non-secret simultaneous transmission destination, a secret simultaneous transmission destination to the address input by the inputting means; and destination setting means for setting the address to any one of the destination, the non-secret simultaneous transmission destination, and the secret simultaneous transmission destination in accordance with the designated transfer-attribute.

The above objects are achieved by an e-mail apparatus for simultaneously transmitting an e-mail to a plurality of destinations, having: inputting means for inputting an address of the e-mail; a table including the address corresponded to any one of transfer-attributes of a destination, a non-secret simultaneous transmission destination, and a secret simultaneous transmission destination; and destination setting means for setting the address to any one of the destination, the non-secret simultaneous transmission destination, and the secret simultaneous transmission destination in accordance with the transfer-attribute corresponding to the address input from the inputting means with reference to the table.

The above objects are achieved by an Internet facsimile apparatus for transmitting an image on Internet or a local area network by use of an e-mail having: scanning means for scanning an image to obtain image data; converting means for converting the image data to an e-mail; inputting means for inputting an address of the e-mail; and destination setting means, when a plurality of addresses is input through the inputting means, for setting a first address of the plurality of addresses to a destination and addresses including and after a second address to a secret simultaneous transmission destination, respectively.

The above objects are achieved by an internet facsimile apparatus for transmitting an image on the Internet or a local area network by use of an e-mail having: scanning means for scanning an image to obtain image data; converting means for converting the image data to an e-mail; inputting means for inputting an address of the e-mail; and destination setting means, when a plurality of addresses is input through the inputting means, for setting a default address and the plurality of addresses to a destination and a secret simultaneous transmission destination, respectively.

The above objects are achieved by an internet facsimile apparatus for transmitting an image on Internet or a local area network by use of an e-mail having: scanning means for scanning an image to obtain image data; converting means for converting the image data to an e-mail; inputting means for inputting an address of the e-mail; transfer-attribute designate means for designating transfer-attribute of any one of a destination, a non-secret simultaneous transmission destination, a secret simultaneous transmission destination to the address input by the inputting means; and destination setting means for setting the address to any one of the destination, the non-secret simultaneous transmission destination, the secret simultaneous transmission destination in accordance with the designated transfer-attribute.

The above objects are achieved by an internet facsimile apparatus for transmitting an image on Internet or a local area network by use of an e-mail having: scanning means for scanning an image to obtain image data; converting means for converting the image data to an e-mail; inputting means for inputting an address of the e-mail; a table including the address corresponded to any one of transfer-attributes of a destination, a non-secret simultaneous transmission destination, a secret simultaneous transmission destination; and destination setting means for setting the address to any one of the destination, the non-secret simultaneous transmission destination, the secret simultaneous transmission destination in accordance with the transfer-attribute corresponding to the address input from the inputting means with reference to the table.

The above objects are achieved by an e-mail communication method for simultaneously transmitting an e-mail to a plurality of destinations, having: setting a first address of a plurality of addresses to a destination and addresses including and after a second address to a secret simultaneous transmission destination, respectively when the plurality of addresses is input; and transmitting the e-mail on the Internet or a local area network.

The above objects are achieved by e-mail communication method for simultaneously transmitting an e-mail to a plurality of destinations, having: setting a default address and a plurality of addresses to a destination and a secret simultaneous transmission destination, respectively when the plurality of addresses is input; and transmitting the e-mail on the Internet or a local area network.

The above objects are achieved by an e-mail communication method for simultaneously transmitting an e-mail to a plurality of destinations, having: designating transfer-attribute of any one of a destination, a non-secret simultaneous transmission destination, a secret simultaneous transmission destination to the address of the e-mail; and transmitting the e-mail on the Internet or a local area network. The above objects are achieved by an e-mail communication method for simultaneously transmitting an e-mail to a plurality of destinations, comprising: setting an address to any one of a destination, a non-secret simultaneous transmission destination, a secret simultaneous transmission destination in accordance with a transfer-attribute corresponding to the input address with reference to a table including the address corresponded to any one of transfer-attributes of the destination, the non-secret simultaneous transmission destination, the secret simultaneous transmission destination; and transmitting the e-mail on the Internet or a local area network.

The present invention makes it possible to carry out simultaneous transmission by a simple operation without recipient's knowing the simultaneous transmission destination.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which:

FIG. 6 is a view showing one example of a transmission mail, which the internet facsimile apparatus according to the first embodiment generates;

FIG. 7 is a view showing one example of an e-mail of the internet facsimile apparatus according to the first embodiment;

DETAILED DESCRIPTION OF THE PREFERRED EMBODIMENTS

First to third embodiments of the present invention will be described with reference to the accompanying drawings.
(First Embodiment)

Figure 1:
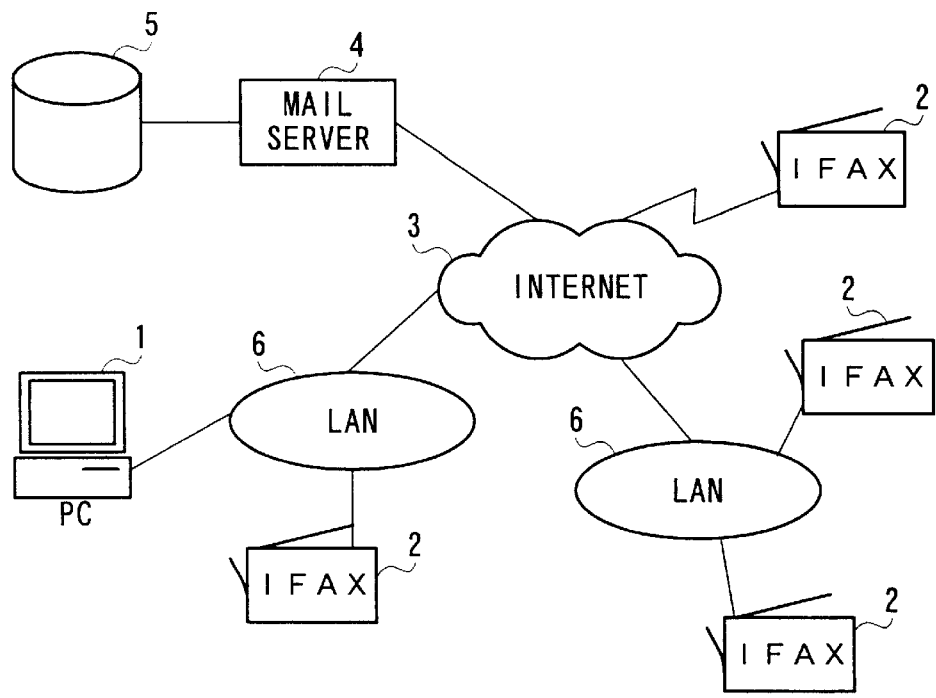
FIG. 1 is a conceptual view of an e-mail communication system.

The following will explain a case in which an e-mail is generally received and transmitted through a mail server with reference to FIG. 1. FIG. 1 is a conceptual view of an e-mail communication system. The e-mail transmitted from PC 1 and an e-mail type facsimile apparatus (internet facsimile apparatus: IFAX) is stored in a secondary data storage device 5 of a mail server 4 provided on the internet 3. A recipient terminal makes an inquiry to the mail server 4. If there is an incoming mail, the recipient terminal carries out a receiving operation so as to receive the e-mail from the mail server 4.

The mail server 4 comprises, for example, a POP (Post Office Protocol) server. The mail server 4 stores e-mails in the secondary data storage device 4 in order of arrival. If there is an inquiry from the recipient's terminal, the mail server 4 notifies the total number of incoming mails after recognizing the user. If there is a request from the recipient's terminal, the mail server 4 transmits the e-mail. Also, if there is a request of deletion, the mail server 4 deletes the e-mail.

IFAX 2 is connected to the internet 3 through a local area network (LAN) 6 or by dial-up connection.

Figure 2:
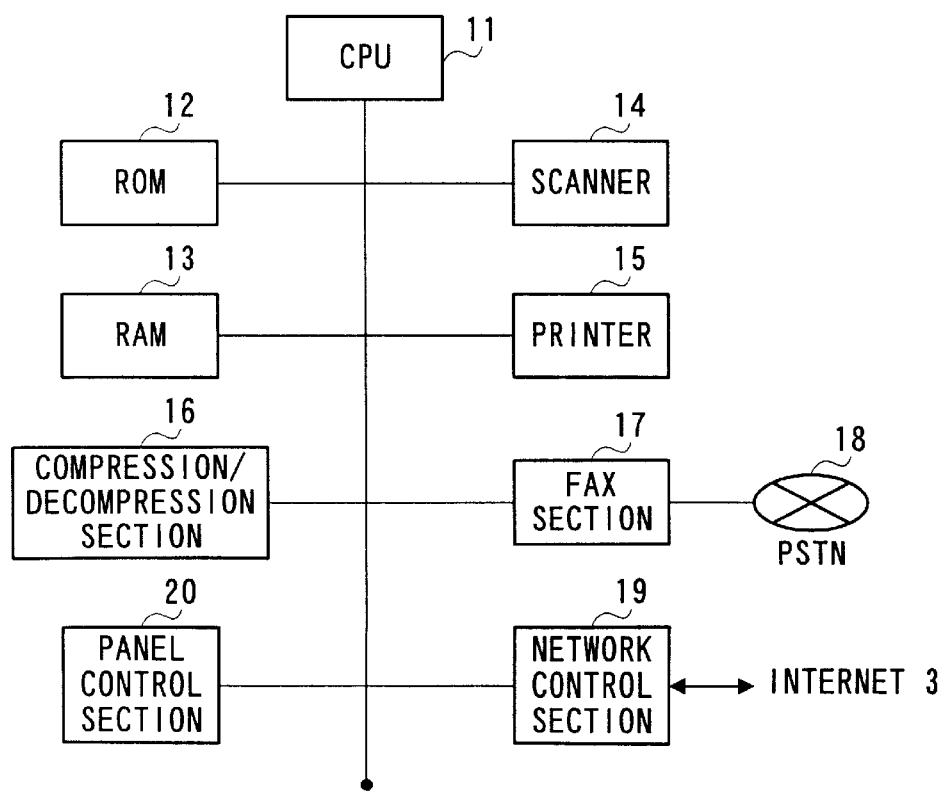
FIG. 2 is a block diagram showing a software configuration of an internet facsimile apparatus according to a first embodiment of the present invention.

FIG. 2 is a block diagram showing a hardware configuration of the internet facsimile apparatus according to the first embodiment of the present invention. A CPU 11 executes a program so as to control the entire apparatus. ROM 12 stores the program, which CPU 11 executes.

RAM 13 is a main memory on which the program is executed, and temporarily stores various kinds of data such as e-mails, image files. In RAM 13, an address area such as an image data storing area, an address book data area, a header generation buffer, a transmission destination address storing buffer, and a program execution area, are prepared.

A scanner 14 scans an original, and gains image data. A printer 15 prints out received image data.

A compression/decompression section 16 compresses raw image data scanned by the scanner to an image file such as an MH file and decompresses a received image file. A FAX section 17 receives and transmits data by facsimile communications, and carries out modulation and demodulation when data is received and transmitted on a public switched telephone network (PSTN) 18.

A network control section 19 is an interface for executing the process necessary for receiving and transmitting the e-mail on the internet 3.

A panel control section 20 has dial keys, and a touch panel, and is used on enter operations such as designation of destination, etc. to the IFAX 4. Specifically, the panel control section 20 has a start button which is assigned to a designation of transmission start.

Figure 3:
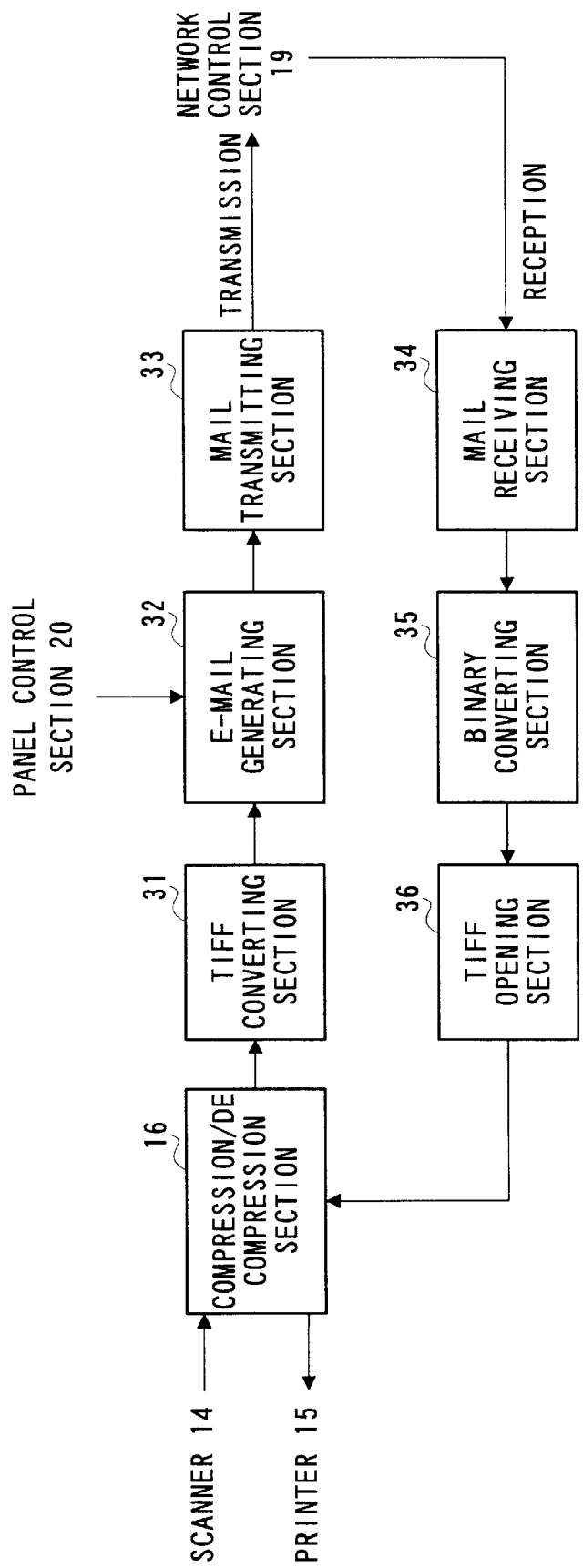
FIG. 3 is a block diagram showing functions of an image communication section of the internet facsimile apparatus according to the first embodiment.

FIG. 3 is a block diagram showing a function of an image communication section of the internet facsimile apparatus according to the first embodiment. In the above internet facsimile apparatus, when the start button is pressed by an operator, the scanner 14 begins to scan originals to gain a raw image data. The raw image data is compressed to compressed data by the compression/decompression section 16. Then, compressed data is converted to a TIFF file by a TIFF converting section 31. A plurality of compressed data corresponding to one page of the original is stored in the TIFF file. The TIFF file with which the internet facsimile apparatus can support in general is defined by RFC 2301 "File Format for internet FAX" issued by IETF (internet Engineering Task Force). Next, an e-mail generating section 32 generates an e-mail including the ITFF file as an appended file. In other words, the TIFF file is text-coded and added to a data section of a e-mail in accordance with such as MIME (Multipurpose internet Mail Extensions). Thereafter, a mail transmitting section 33 transmits the e-mail to the mail server 4 through the network control section 19.

While, at a receiving time, the e-mail transmitted by the mail transmitting section 34 is received from the mail server 4. Then, a binary converting section 35 binary converts an appended file portion of the received e-mail to the TIFF file from the text code. Thereafter, a TIFF decompressing section 36 decompresses the TIFF file. Next, the compression/decompression section 16 decompresses compressed data and sends decompressed data to the printer 15. The printer 15 prints out an image.

At a mail transmitting time, an operator inputs a mail address of a transmission destination from the control panel 20. The e-mail generating section 32 generates a mail header based on the input mail address.

Figure 4:
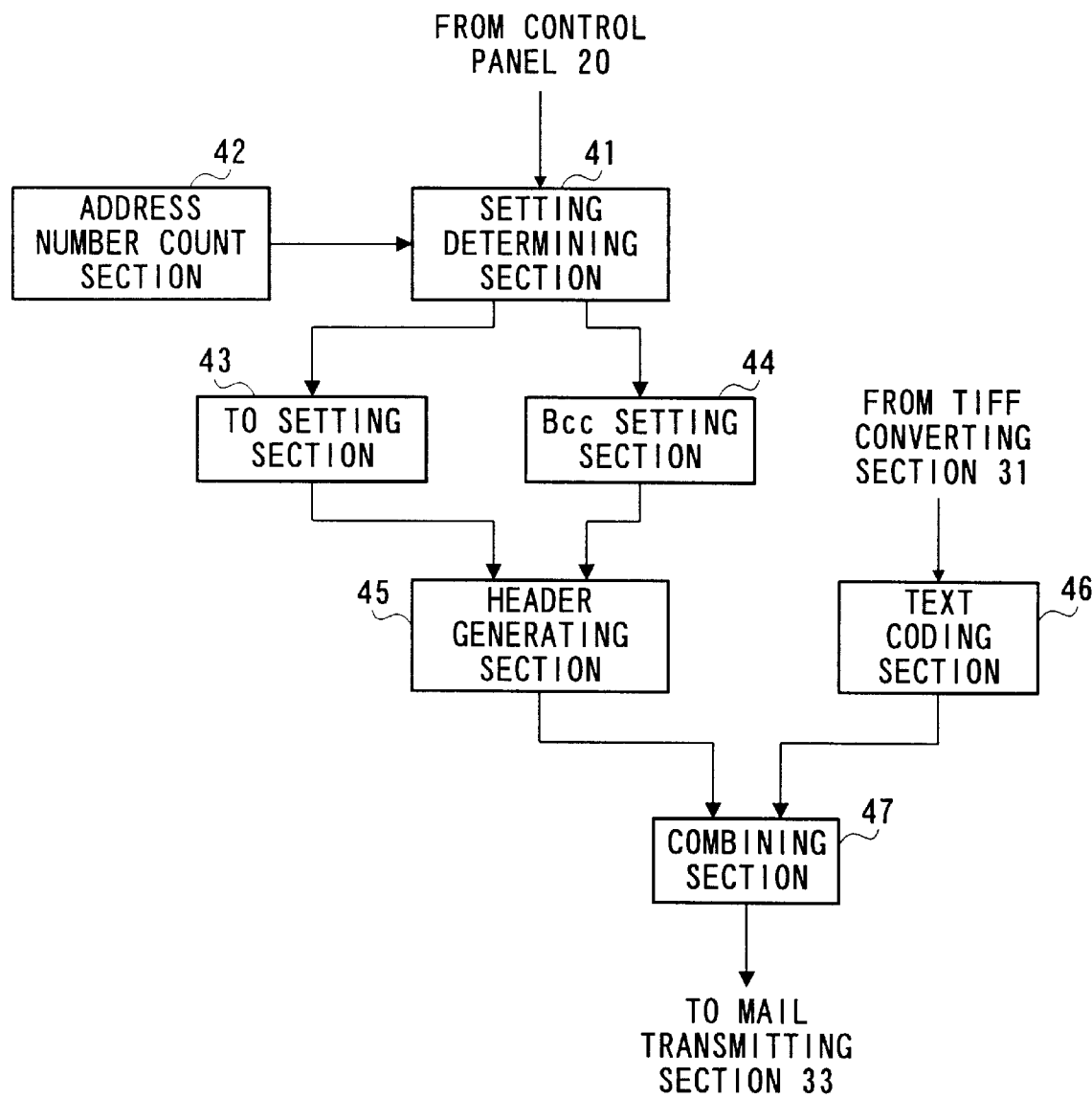
FIG. 4 is a block diagram showing functions of an e-mail generating section of the internet facsimile apparatus according to the first embodiment.

FIG. 4 is a functional block diagram showing the e-mail generating section of the internet facsimile apparatus according to the first embodiment. The functions of the respective sections to be described later are realized by a program code, which instructs CPU 11 to execute processing for performing these functions. The program code is stored in ROM 13.

A setting determining section 41 determines that the addresses sequentially sent from the control panel 20 is set to either the destination or the secret simultaneous destination.

An address number count section 42 counts the number of addresses processed by the setting determining section 41.

A To setting section 43 and a Bcc setting section 44 set addresses to a field [To:] of the mail header and a field [Bcc] thereof, respectively.

A header generating section 45 generates a header of an e-mail according to the setting at the To setting section 43 and the Bcc setting section 44.

A text coding section 46 converts TIFF data received from the TIFF converting section 31 to text-code, to gain a data part.

A combining section 47 combines the mail headers received from the header generating section 45 with the data part converted in the text coding section 46, and generates an e-mail. The combination of the mail headers and the data part are carried out based on such as MIME. The combining section 47 sends the generated e-mail to the mail transmitting section 33.

Figure 5:
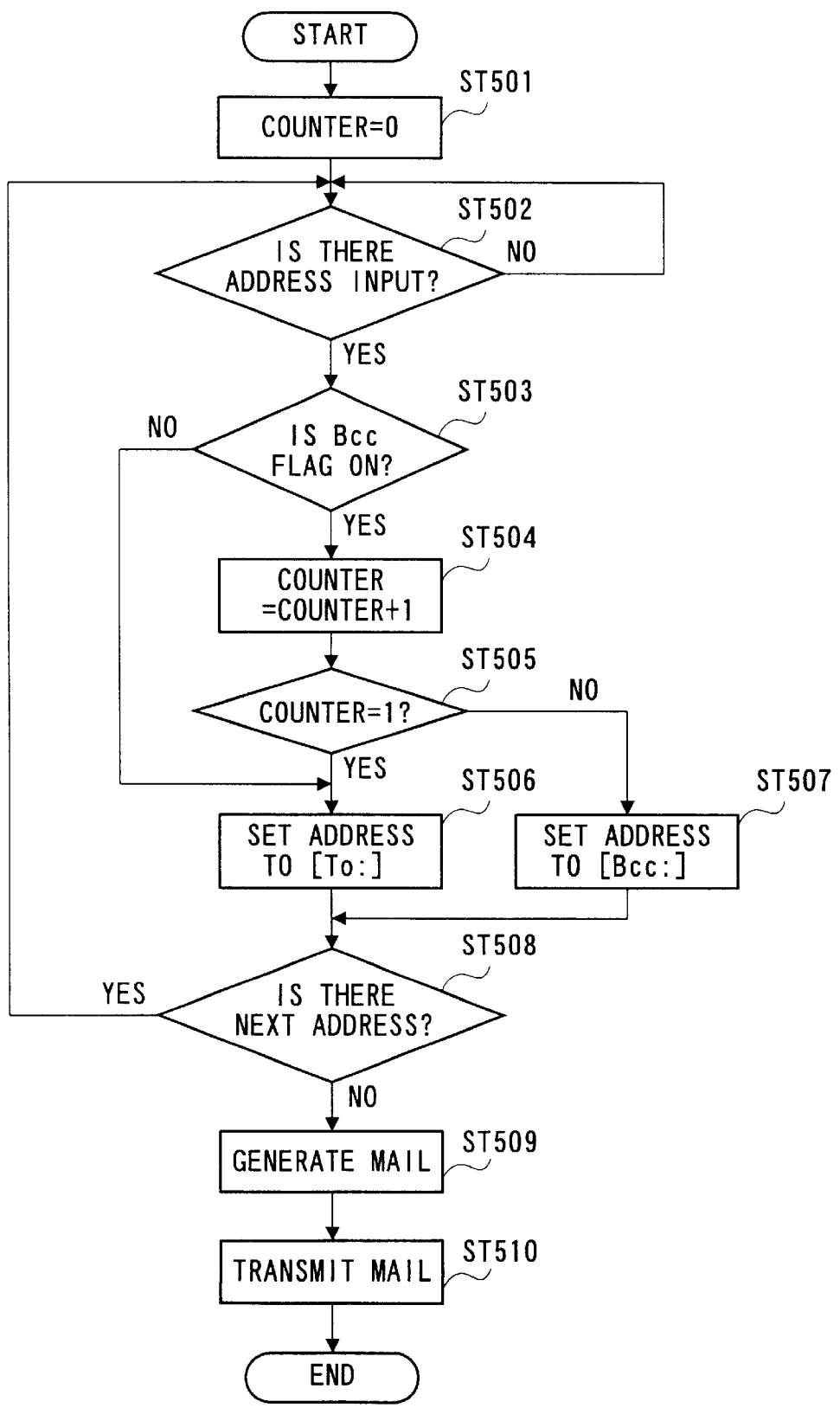
FIG. 5 is a flowchart showing each process of a simultaneous transmission of the e-mail in the internet facsimile apparatus according to the first embodiment.

Next, an e-mail transmission to a plurality of addresses in the internet facsimile apparatus according to the first embodiment will be explained. FIG. 5 is a flowchart showing each process of the simultaneous transmission of the e-mail in the internet facsimile apparatus according to the first embodiment.

In step (hereinafter referred to as ST) 501, the address number count section 42 resets a count number to "0". Next, in ST502, the presence or absence of address input is checked. The operator inputs an address through the control panel 20, and depresses a set button if there is an address to be input next. On the other hand, if there is not a next address, the operator depresses a start button.

In a case where there is an address input in ST502, a set determining section 41 checks whether or not a Bcc flag is on in ST503. If the Bcc flag is on in ST503, the address number count section 42 increments the count by 1.

Next, in ST505, the set determining section 41 checks whether or not the counter is 1. In other words, the set determining section 41 checks whether or not the address is the first.

If the counter is 1 in ST505, the set determining section 41 determines that the address is set to the field [To:] in ST506. While, if the counter is more than 1 in ST505, the set determining section 41 determines that the address is set to the field [Bcc:] in ST507. The content of the setting in which the address is made to correspond to the kind of fields [To:], [Bcc:], that is, the transfer-attribute is temporarily stored in the header generation buffer of RAM 13.

Next, in ST508, it is checked whether or not there is an address to be input next. If the operator depresses the set button after inputting the address, it is determined that there is the address to be input next. If the operator depresses the start button after inputting the address, it is determined that there is no address to be input next.

If it is determined that there is the address to be input next in ST508, the operation goes back to ST502. On the other hand, if it is determined that there is no address to be input next, an e-mail is generated. More specifically, the header generation section 45 describes the address input first in the field [To:] of the mail header. The addresses including and after the second address are described in the field [Bcc:] of the mail header. Next, the mail header generated by the header generating section 45 and the TIFF file text-coded by the text code section 46 are combined with each other by the combining section 47, so that an e-mail is generated as shown in FIG. 6.

If the Bcc flag is off in ST503, the operation goes to ST506, all addresses are set to the field [To:].

In the internet facsimile apparatus according to the first embodiment, only the address input first is set to the field [To:] showing the destination. The addresses including and after the second address are set to the field [Bcc:] showing the secret simultaneous transmission destination. Since the field [Bcc:] is removed from the mail header of the transmitted e-mail by the mail server 4, only the field [To:] is described in the mail header of the received e-mail as shown in FIG. 7. As a result, the recipient can not know to whom the e-mail is simultaneously transmitted. Moreover, since the operator may just input the address, little time can be expended in the operation. Also, this provides excellent usability of the apparatus.

In ST503, it is checked whether the secret simultaneous transmission flag is on or off. Then, if the secret simultaneous transmission flag is not on, all input addresses are described in the field [To:]. Therefore, when the sender wishes to notify the recipient of the counterpart of the simultaneous transmission, the sender may change only the setting.

In the aforementioned first embodiment, the first address was set to the destination. However, an arbitrary address including and after the second may be set to the destination. Further, A plurality of address may be set to the destination.

Also, an address designated at a default value, for example, a sender's address is set to the destination, and all input addresses may be set to the secret simultaneous transmission destination.

(Second Embodiment)

Figure 8:
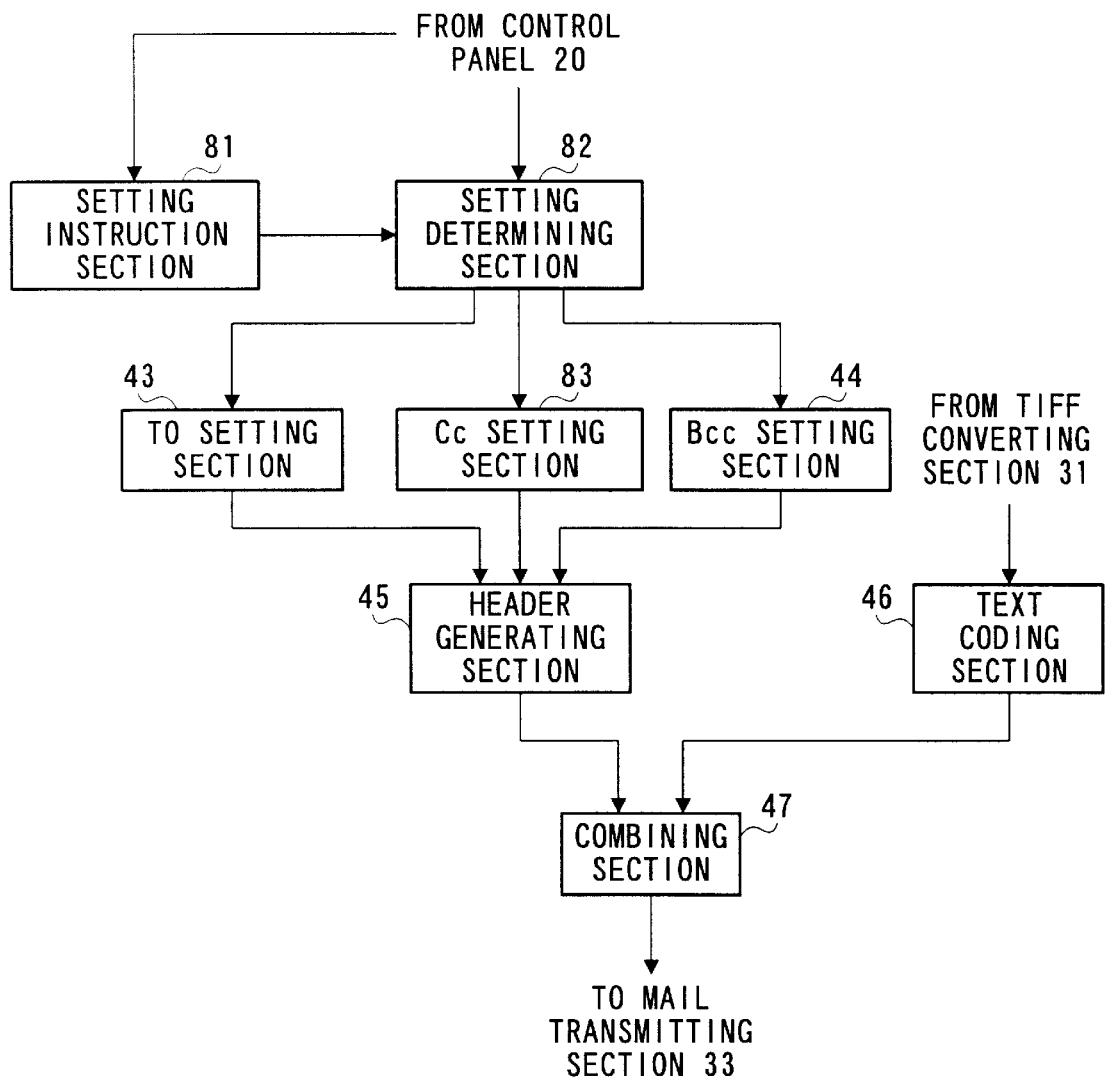
FIG. 8 is a functional block view showing an internet facsimile apparatus according to a second embodiment of the present invention.
Figure 9:
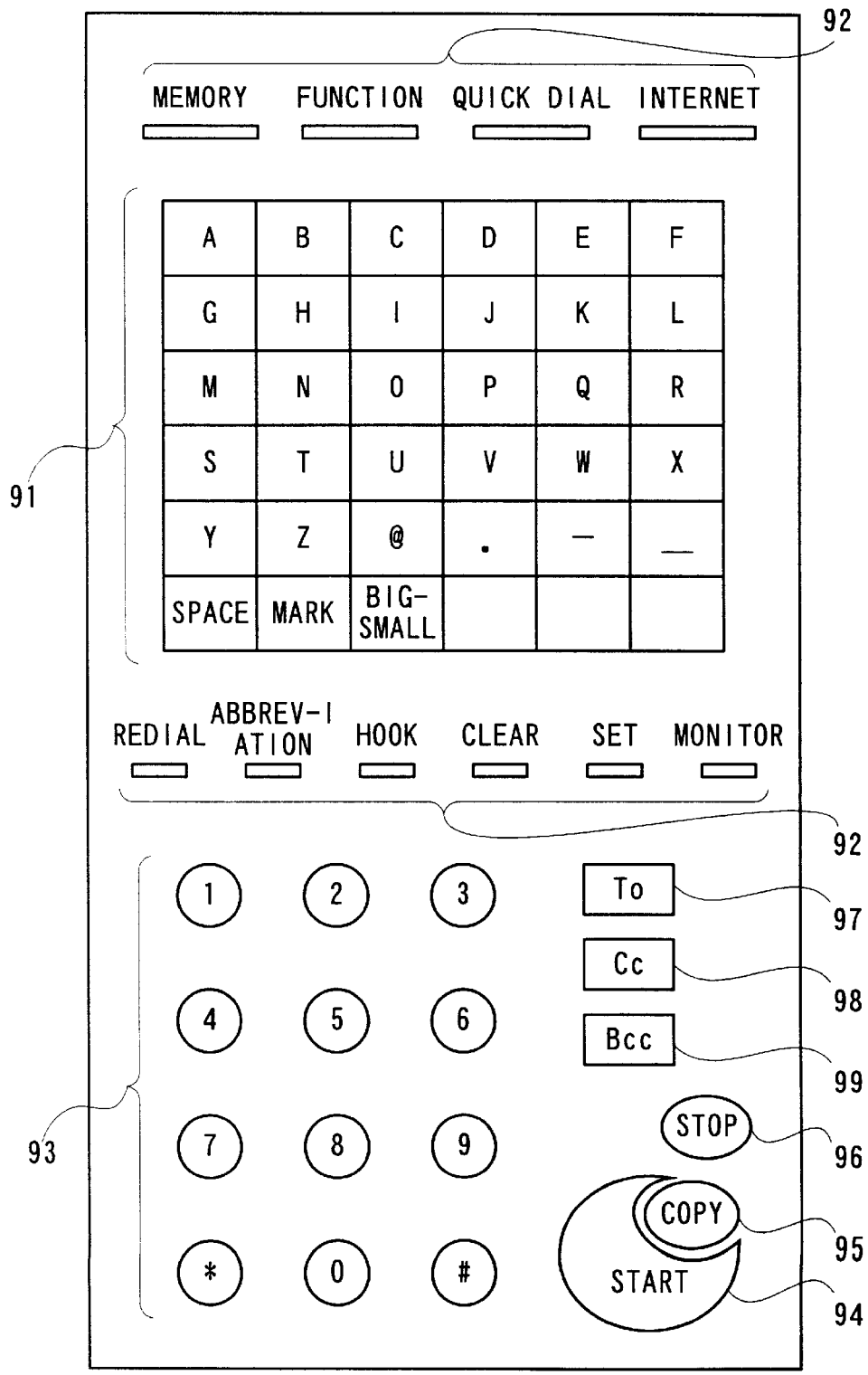
FIG. 9 is a plane view showing one example of a control panel of the internet facsimile apparatus according to the second embodiment.

Next, an internet facsimile apparatus according to the second embodiment of the present invention will be explained. FIG. 8 is a functional block view showing the internet facsimile apparatus according to the second embodiment. In this figure, the same reference numerals as those of the first embodiment are added to the portions common to the first embodiment, and the explanation will be omitted. FIG. 9 is a plane view showing one example of the control panel.

The internet facsimile apparatus of the second embodiment can select [To:], [Cc:], and [Bcc:] from the control panel. The control panel 20 has an address input section 91 for inputting an address as shown in FIG. 9. On the upper and lower portions of the address input section 91, function keys 92 to which various functions are provided are arranged. A 10-button keypad 93 for inputting numeric figures is provided at a lower portion than the address input portion 91. A start key 94, a copy key 95, and a stop key 96 are arranged at the right side of the 10-button keypad 93, respectively. Setting instruction keys 97, 98, and 99 are arranged at an upper portion than the stop key 96. The transfer-attributes, [To:], [Cc:], [Bcc:], are assigned to the setting instruction keys 97, 98, 99, respectively.

A setting instruction section 81 shown in FIG. 8 instructs a setting determining section 82 to determine the transfer-attribute of the input address in accordance with the input from any one of the setting instruction keys 97 to 99.

The setting determining section 82 determines which transfer-attribute is set to the address input in accordance with the instruction from the setting instruction section 81, and provides instruction to any one of the To setting section 43, a Cc setting section 83, the Bcc setting 44.

Figure 10:
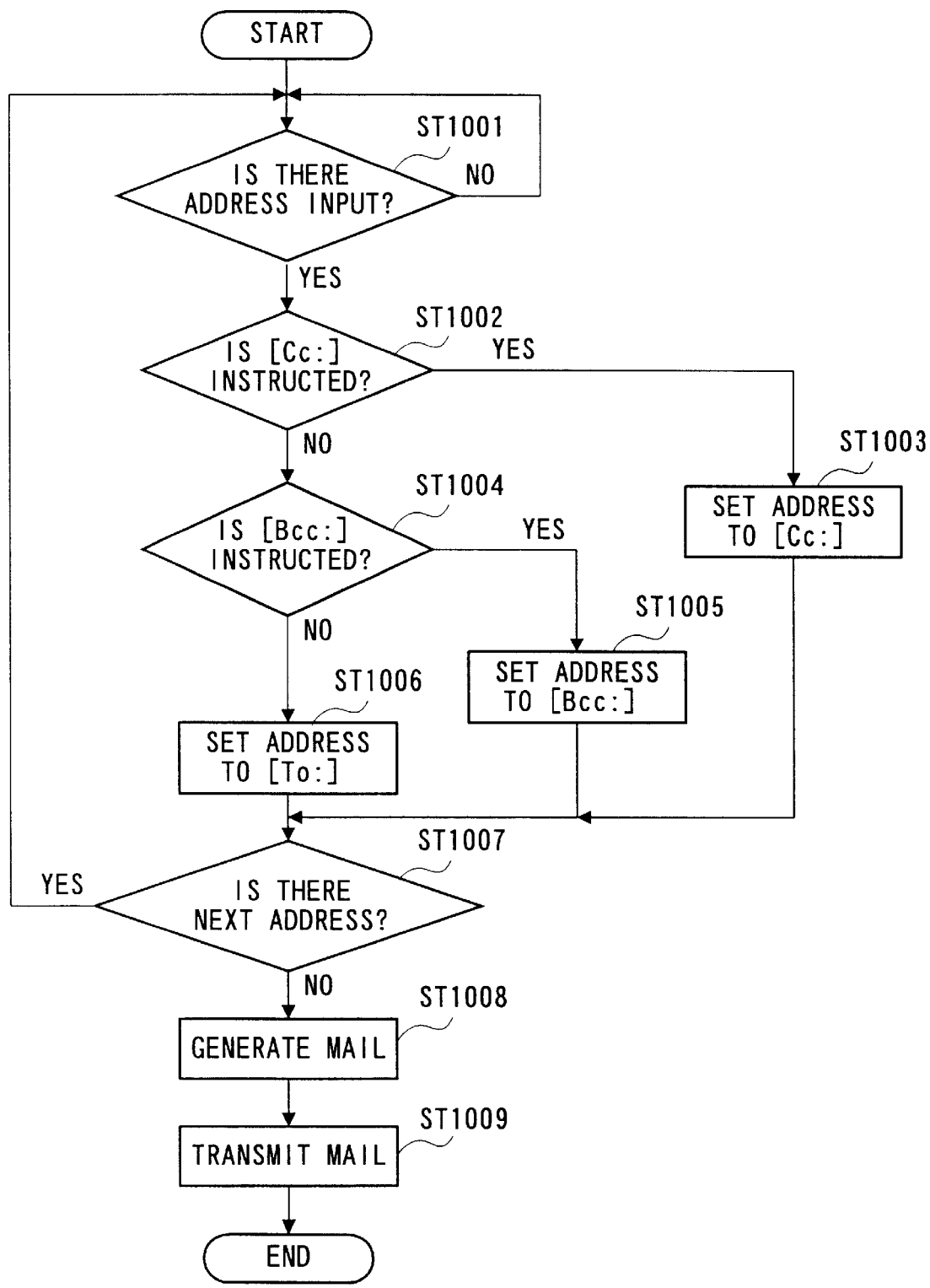
FIG. 10 is a flowchart showing each process of a simultaneous transmission in the internet facsimile apparatus according to the second embodiment.

Next, the following will explain the procedure of the simultaneous transmission in the internet facsimile apparatus according to the second embodiment. FIG. 10 is a flowchart showing each process of a simultaneous transmission in the internet facsimile apparatus according to the second embodiment.

In ST1001, the presence or absence of address input is checked. The operator inputs an address through the control panel 20, and depresses any one of the setting instruction keys 97 to 99 to instruct the transfer-attribute. If there is an address to be sequentially input, the operator depresses the set button of the function keys 92. On the other hand, if there is not a next address, the operator depresses the start button 94.

If there is the address input in ST1001, the setting instruction section 81 sends the content of the setting instruction to the setting determining section 82.

In ST1002, the setting determining section 82 checks whether or not simultaneous transmission, that is, [Cc:] is instructed as a transfer-attribute. If [Cc:] is instructed in this step, the Cc setting section 83 sets the address to the field [Cc:] in ST1003.

If [Cc:] is not instructed in ST1002, the setting determining section 82 checks whether or not the secret simultaneous transmission, that is, [Bcc:] is instructed as a transfer-attribute in ST1004. If [Bcc:] is instructed in this step, the Bcc setting section 84 sets the address to the field [Bcc:] in ST1005.

If [Bcc:] is not instructed in ST1004, the To setting section 43 sets the address to the field [To:] in ST1006.

Next, in ST1007, it is checked whether or not there is an address to be input next. If there is the address to be input next in this step, the operation goes back to ST1001. On the other hand, if there is no address to be input next, an e-mail is generated in ST1008. Next, the mail header generated by the header generating section 45 and the TIFF file text-coded by the text code section 46 are combined with each other by the combining section 47, so that an e-mail is generated. The generated e-mail is transmitted in ST1009.

According to the internet facsimile apparatus of the second embodiment, after inputting the address from the control panel 20, destination [To:], simultaneous transmission [Cc:], secret simultaneous transmission [Bcc:] are input to the setting instruction section 82 from the setting instruction keys 97 to 99. The setting determining section 82 determines to which field the address is set in accordance with the content of instruction sent from the setting instruction section 81. Thus, the operator can provide the transfer-attribute to the address by only depressing the setting instruction keys 97 to 99 after inputting the address. The transfer-attribute can be included in the mail header or hidden for each address by the simple operation. As a result, in the internet facsimile apparatus, the simultaneous transmission can be precisely set.

In the second embodiment, the setting instruction keys 97 to 99 were provided. However, a key, which is provided in the general facsimile apparatus, for example, a set key may be used. For example, after the address input, if the set key is depressed one time, [To:] is set. If the set key is depressed twice, [Cc:] is set. If the set key is depressed three times, [Bcc:] is set.

(Third embodiment)

Figures 11, 12:
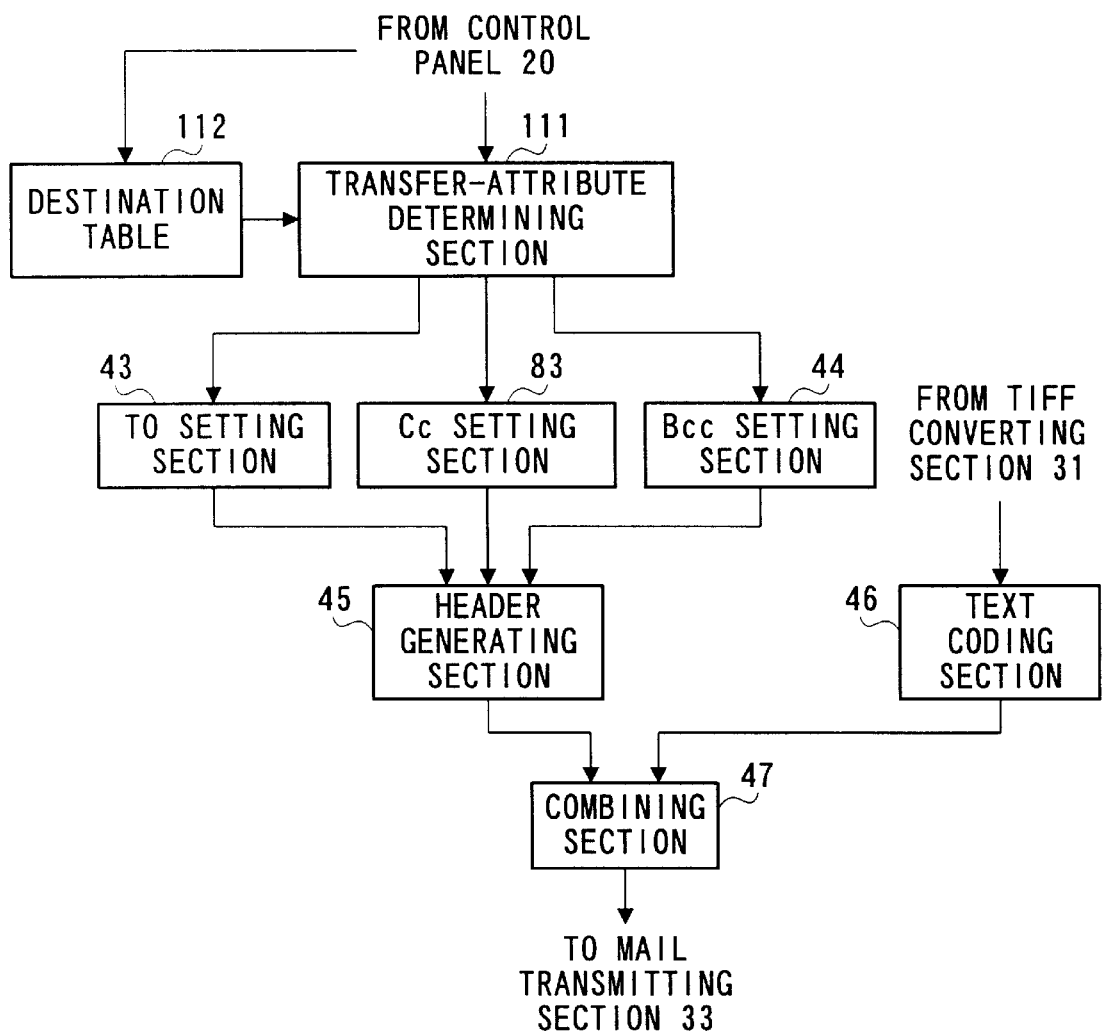
FIG. 11 is a functional block view showing an internet facsimile apparatus according to a third embodiment of the present invention.
FIG. 12 is a view showing one example of a destination table of the internet facsimile apparatus according to the third embodiment.

Next, an internet facsimile apparatus according to the third embodiment of the present invention will be explained. FIG. 11 is a functional block view showing the internet facsimile apparatus according to the third embodiment. In this figure, the same reference numerals as those of the first and second embodiments are added to the portions common to the first and second embodiments, and the explanation will be omitted. FIG. 12 is a view showing one example of a destination table.

A transfer-attribute determining section 111 determines the transfer-attribute of the address input from the control panel 20 with reference to a destination table 112. In the destination table 112, flags of transfer-attributes [To:], [Cc:], [Bcc] to be set for each address are set up.

Figure 13:
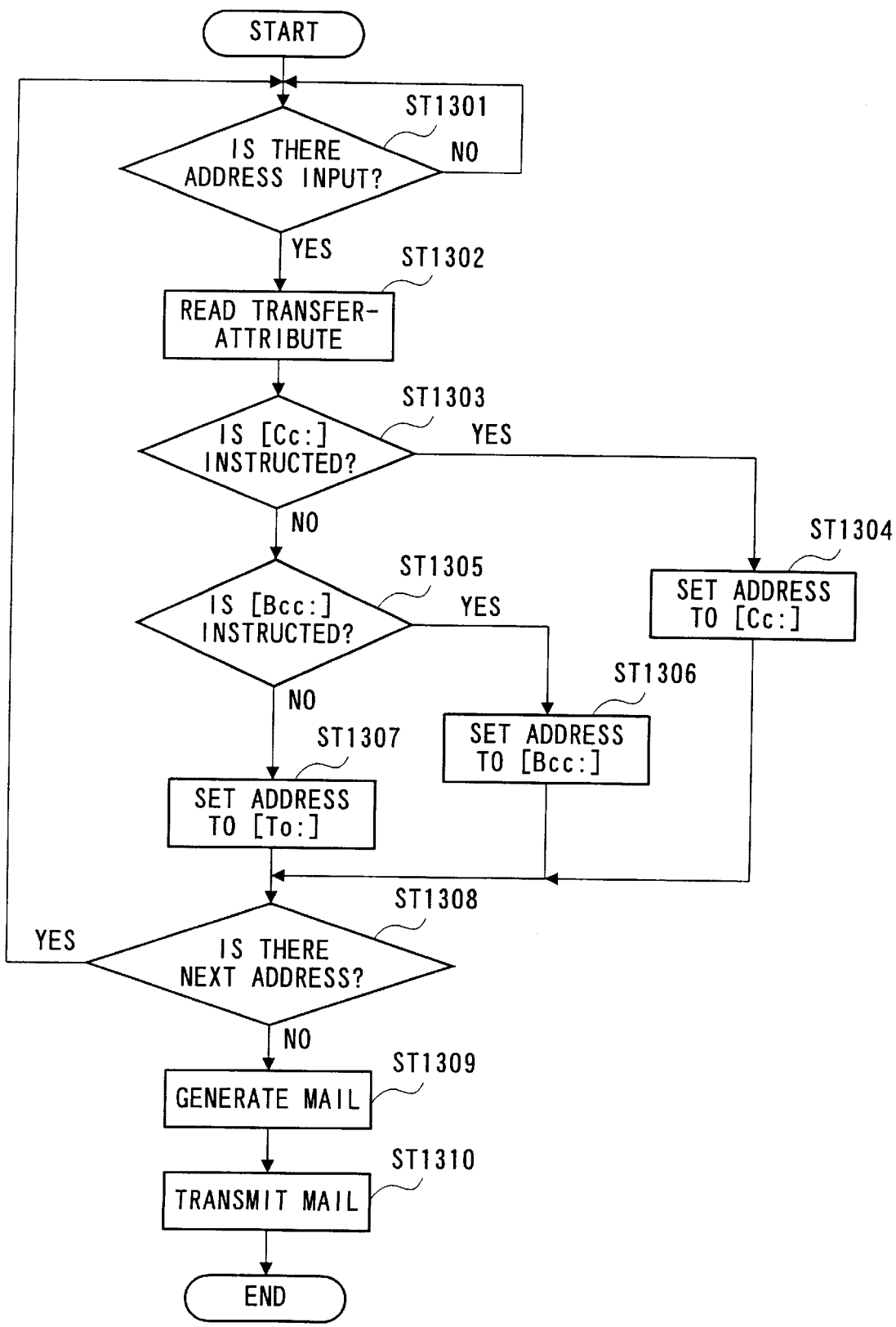
FIG. 13 is a flowchart showing each process of a simultaneous transmission in the internet facsimile apparatus according to the third embodiment.

Next, the following will explain the procedure of the simultaneous transmission in the internet facsimile apparatus according to the third embodiment. FIG. 13 is a flowchart showing each process of the simultaneous transmission in the internet facsimile apparatus according to the third embodiment.

In ST1301, the presence or absence of address input is checked. The operator inputs an address through the control panel 20. Then, if there is an address to be sequentially input, the operator depresses the set button. On the other hand, if there is not a next address, the operator depresses the start button.

In ST1302, the transfer-attribute determining section 111 reads a transfer-attribute corresponding to the address from the address table 112.

In ST1303, the transfer-attribute determining section 111 checks whether or not the transfer-attribute is [Cc:]. If the transfer-attribute is [Cc:], the Cc setting section 83 sets the address to the field [Bcc:] in ST1304.

If the transfer-attribute is not [Cc:] in ST1305, the To setting section 43 sets the address to the field [To:] in ST1307.

Next, in ST1308, it is checked whether or not there is an address to be input next. If it is determined that there is the address to be input next in this step, the operation goes back to ST1301. On the other hand, If it is determined that there is no address to be input next, an e-mail is generated. Next, the mail header generated by the header generating section 45 and the TIFF file text-coded by the text code section 46 are combined with each other by the combining section 47, so that an e-mail is generated. The generated e-mail is transmitted in ST1310.

In the internet facsimile apparatus according to the third embodiment, the transfer-attribute determining section 111 determines to which transfer-attribute is provided to the input address with reference to the destination table 112 registered in advance, so that the address is set to any one of fields [To: ], [Cc:], [Bcc:]. Thus, the operator may only input the address, and does not have to designate the field. As a result, in the internet facsimile apparatus, the simultaneous transmission can be precisely set by the simple operation.

Further, in the aforementioned embodiment, the facsimile apparatus was explained as a communication terminal. However, the scope of the present invention includes the other image communication terminal apparatus. For example, the present invention includes a PC to which a LAN card or a modem is connected to the internet. The scanner or the printer can be connected to the PC through an external section I/F. The present invention also includes a network scanner having a network communication interface, and a network copy machine. Moreover, the present invention includes an image combination machine comprising a scanner, a printer, a copy machine, a facsimile apparatus, etc.

Furthermore, the present invention includes a computer-readable storage medium having a program code causing a computer to execute the same processing as that of the facsimile apparatus according to the aforementioned embodiment.

The present invention is not limited to the above described embodiments, and various variations and modifications may be possible without departing from the scope of the present invention.

This application is based on the Japanese Patent Application No.HEI 11-27096 filed on Feb. 4, 1999, entire content of which is expressly incorporated by reference herein.

What is claimed is:

1. An e-mail apparatus for simultaneously transmitting an e-mail to a plurality of destinations, comprising:

an input section that inputs a plurality of destination addresses of the e-mail to be transmitted;

a counter that counts a number and assigns a value to each of the destination addresses input by said input section; and a setting section that sets a first destination address of said plurality of destination addresses input by said input section to a destination defined by said first destination address, and sets other addresses of said plurality of destination addresses input by said input section to at least one simultaneous transmission destination, defined by the other addresses, based on a value of said counter for each of the plurality of destination addresses.

2. The e-mail apparatus according to claim 1, wherein the at least one simultaneous transmission destination is not identified in the e-mail to said other addresses.

3. The e-mail apparatus according to claim 1, further comprising a mail generator that combines a mail header including the destination defined by the first destination address and the simultaneous transmission destinations, with a TIFF file, to generate e-mail, the simultaneous transmission destinations being eliminated by a server connected to the e-mail apparatus, whereby the simultaneous transmission destinations are not present on a mail header of the received e-mail at the simultaneous destination addresses.

4. The e-mail apparatus according to claim 1, wherein, when a simultaneous transmission flag is off, said setting section sets each address as a first destination address.

5. The e-mail apparatus according to the claim 1, further comprising a scanner that scans an original to obtain image data, wherein the image data is converted to the e-mail to be transmitted.

6. The e-mail apparatus according to claim 5, further comprising:

a compressor that compresses image data scanned by said scanner to a facsimile data; and a facsimile section that transmits the facsimile data to a facsimile destination.

7. An e-mail communication method for simultaneously transmitting an e-mail to a plurality of destinations, comprising:

inputting a plurality of destination addresses of the e-mail by an input section;

counting a number and assigning a value to each of the destination addresses input by the input section; and setting a first destination address of the plurality of destination addresses input by the input section to a destination defined by the first destination address, and setting other addresses of the plurality of destination addresses input by the input section to simultaneous transmission destinations, respectively, based on a count value of each of the plurality of destination addresses.

8. The e-mail communication method according to claim 7, further comprising combining a mail header including the destination defined by the first destination address and the simultaneous transmission destinations, with a TIFF file, to generate e-mail, the simultaneous transmission destinations being eliminated by a server connected to the e-mail apparatus, whereby the simultaneous transmission destinations are not present on a mail header of a received e-mail at each of the plurality of simultaneous transmission destinations.

9. The e-mail communication method according to claim 7, wherein when a simultaneous transmission flag is off, the setting sets all addresses to the first destination address.

10. The e-mail communication method according to claim 7, further comprising eliminating the presence of the simultaneous transmission destination on a mail header of a received e-mail at each of the simultaneous transmission destinations.

* * * * *